United States Patent [19]

Bieck et al.

[11] Patent Number: 5,363,961
[45] Date of Patent: Nov. 15, 1994

[54] DEVICE FOR STORING MAGNETIC TAPE CASSETTES

[75] Inventors: Torsten Bieck, Dornstetten/Hallwangen; Eduard Kaupp, Salzstetten; Christoph Stephan, deceased, late of Sindelfingen, by Dorothea Stephan, heir; Otto Stephan, heir; Isle Stephan, heir, both of Böblingen-Dagersheim, all of Germany

[73] Assignee: fischerwerke, Artur Fischer GmbH & Co. KG, Waldachtal/Tumlingen, Germany

[21] Appl. No.: 75,818

[22] Filed: Jun. 11, 1993

[30] Foreign Application Priority Data

Jun. 12, 1992 [DE] Germany .................. 4219232

[51] Int. Cl.5 ............ B65D 85/672; G11B 23/023
[52] U.S. Cl. ........................ 206/387; 312/319.1
[58] Field of Search ............... 206/387; 312/319.1

[56] References Cited

U.S. PATENT DOCUMENTS

| | | | |
|---|---|---|---|
| 3,554,463 | 1/1971 | Theuwissen | 206/387 X |
| 3,899,229 | 8/1975 | Ackeret | 206/387 X |
| 4,030,601 | 6/1977 | Ackeret | 206/387 |
| 4,196,806 | 4/1980 | Posso | 206/387 |
| 4,875,584 | 10/1989 | Ackeret | 206/387 |
| 5,215,212 | 1/1993 | Stephan | 206/387 X |

FOREIGN PATENT DOCUMENTS

| | | |
|---|---|---|
| 0383007 | 8/1990 | European Pat. Off. . |
| 0463320 | 1/1992 | European Pat. Off. . |
| 2427109 | 1/1976 | Germany . |
| 3816384 | 11/1989 | Germany . |
| 3904787 | 8/1990 | Germany . |
| 4039954 | 6/1992 | Germany . |
| 2100706 | 1/1983 | United Kingdom . |
| 862226 | 9/1981 | U.S.S.R. . |
| 22899 | 12/1992 | WIPO .................. 206/387 |

*Primary Examiner*—William I. Price
*Attorney, Agent, or Firm*—Michael J. Striker

[57] ABSTRACT

A device for storing magnetic tape cassettes has a housing with a slider member insertable against a spring force and adapted to support a compact cassette. A locking member can be introduced into the reel hub of the compact cassette only when it is inserted. It is actuated by a shaft and an actuating element formed as a one-piece part. When a digital cassette is inserted, the locking member remains below the supporting surface of the slider member.

3 Claims, 5 Drawing Sheets

DEVICE FOR STORING MAGNETIC TAPE CASSETTES

BACKGROUND OF THE INVENTION

The present invention relates to devices for storing magnetic tape cassettes.

More particularly, it relates to devices for storing magnetic tape cassettes which have locking members engageable with two tape reel hubs of a compact cassette placed on a supporting surface in the device.

Devices of the above mentioned general type are known in the art. One of such devices is disclosed, for example, in U.S. Pat. No. 3,899,229. The known devices which are also called storage containers for magnetic tape cassette have a housing with a slider insertable into the housing against a spring force and lockable in the inserted position. The slider holds the particular cassette to be stored, which in the removal position of the slider can be easily removed or exchanged. In the removal position, the slider protrudes significantly from the housing and can be unlocked by operating a button.

Such storage containers have been used for a long time for storing commercially available compact cassettes, whose tape reel hubs are freely accessible. For preventing uncontrolled movements of the reel hubs and consequently also of the wound-up material, storage containers with locking members for the reel hubs have been developed. A known device of this type has rigid locking projections which project from the slider. The projections engage in the reel hubs of a compact cassette when it is located on the slider and secure them against rotation. However, closed magnetic tape cassettes cannot be placed on the slider provided with such rigidly mounted locking projections, and therefore the known device is not suitable for storing digital cassettes (DCC) which have completely closed wide faces.

Digital cassettes can be played back in playback apparatuses which are compatible with compact cassettes. The dimensions of the digital cassettes substantially correspond to the dimensions of the compact cassettes. However, the housing of the standardized compact cassettes has an enlargement in the region in which the playback and recording heads of a tape recorder engage with the magnetic tape. The housing enlargement is formed by two elevations created on opposing wide faces of the compact cassette. The elevations have a trapezoidal contour on the plan view. On the other hand, the digital cassettes do not have such elevations.

SUMMARY OF THE INVENTION

Accordingly, it is an object of the present invention to provide a device for storing magnetic tape cassettes which avoids the disadvantages of the prior art.

More particularly, it is an object of the present invention to provide a device for storing magnetic tape cassettes, which permits storing of compact cassettes and digital cassettes so that its locking members enter the locking position only when a compact cassette is inserted.

In keeping with these objects and with others which will become apparent hereinafter, one feature of the present invention resides, briefly stated, in a device for storing magnetic tape cassettes, in which the locking members for locking the tape reel hubs are pivotable into a locking position against the force of spring elements, an elevation on the inserted compact cassette projects into a recess and presses there against actuating elements located in the recess and connected with respective locking members causing the locking members to be pivoted into the locking position, and when the compact cassette is removed the locking members lie below the supporting surface and the actuating elements are lifted from the base of the recess at most to the supporting surface surface of the device.

When the device is designed in accordance with the present invention, the locking members pivotable against a spring force into the locking position are actuated by actuating elements when a compact cassette is inserted. For this purpose, the actuating elements are located in the recess in which the compact cassette engages with one of the elevations formed on its wide faces. When a digital cassette which does not have such elevation is inserted, the actuating elements are not actuated and the locking members are not pivoted out of the supporting plane. When the digital cassette is inserted, the locking members do not contact the cassette housing and therefore scratch marks which would otherwise occur on the cassette housing are avoided.

In accordance with another feature of the present invention, the locking members are formed so that they project from a shaft, on which the actuating element is integrally molded. Preferably, the shaft with the actuating element and the locking member is formed as a one-piece injection-molded plastic part. The locking member and the actuating element are oriented relative to one another so that they are located opposite to each other. Therefore when the actuating element is depressed, the shaft rotates through approximately 70° and thereby the locking member which projects from it upwards pivots into the locking position.

The locking member can be formed as a flat plastic bar with a width which is slightly smaller than the diameter of the reel hub, but larger than the spacing between the opposite driving members of the reel hub. With such a construction the locking member can be pivoted without difficulties into the locking position in the region of the reel hub and form a secure lock for the reel hub.

In accordance with another feature of the present invention, the device preferably has a slider which can move the inserted cassette out of the housing into an easily accessible removal position. The device can be formed so that the magnetic tape cassettes are inserted transversely, and in this case the slider member is provided with a depression immediately behind the front wall in which the corresponding elevation of a compact cassette can engage. This has the advantage that when the cassette is inserted, it is positioned on the slider member with its rearward region and pushed backwards until the front region with the elevation is located behind the front wall and can be lowered onto the slider member. The actuating elements and therefore also the locking members are actuated only when the end position is reached. When the compact cassette is removed, then in reverse order the region of the cassette with the elevations has to be lifted and thereby the locking members are rendered inactive. The cassette can be then removed from the slider member without obstruction.

When the actuating elements are inoperative, the locking members are located below the supporting surface. A prestressed spring wire engages a projection which projects from the shaft and holds the associated locking member in this position by the spring force. Also another spring element can transfer the torque required for this action to the shaft.

The novel features of the present invention are set forth in particular in the appended claims. The invention itself, however, both as to its construction and manner of operation, will be best understood from the following description of preferred embodiments, which is acccompanied by the following drawings.

DESCRIPTION OF PREFERRED EMBODIMENTS

Figure 1:
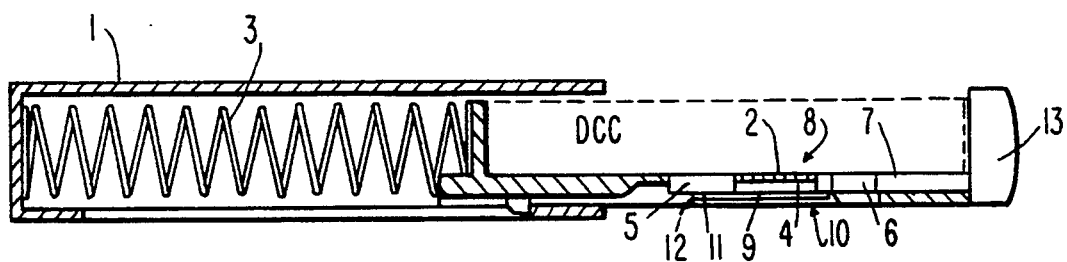
FIG. 1 is a view showing a longitudinal section of a device for storing magnetic tape cassettes in accordance with the present invention, with a slider member in a removal position.

The device for storing magnetic tape cassettes in accordance with the present invention is utilized for storing compact cassettes and digital cassettes. The device has a housing 1 and a slider member 2 which in FIG. 1 is shown in a removal position. The slider member 2 can be inserted against the force of a compression spring 3 into the housing 1 to a storage position and locked there. The locking means are not shown in the drawings since they are generally known and are not the subject of the present invention.

The device further has a shaft 4. At one end the shaft has a flat locking member 5 and at the other end it has an actuating element 6. The shaft 4 is rotatably mounted on the sliding member 2. From the plan view of FIG. 2 it can be clearly seen that the locking member 5 projects away from shaft 4 to one side and the actuating element 6 projects away from the shaft 4 at another side in a direction opposite to the locking member 5.

As can be seen from FIG. 1, the actuating element 6 projects into a recess 7. In the shown unstressed position it does not protrude beyond the supporting surface 8 of the slider member 2. The locking member 5 has the same position and is also located below the supporting surface 8. A spring wire 9 is fixed to the underside of the sliding member 2. It acts with its free end 11 on a projection 12 which projects radially downwardly from the shaft 4. The prestressed spring wire 9 thereby presses the locking element into the shown lower position.

When a digital cassette is inserted in the device, the contour of which is illustrated by a broken line, it does not contact the actuating element 6. Therefore, the locking member 5 is also not pivoted out of the shown position. The locking member 5 is therefore inactive with the digital cassette inserted.

Figure 2:
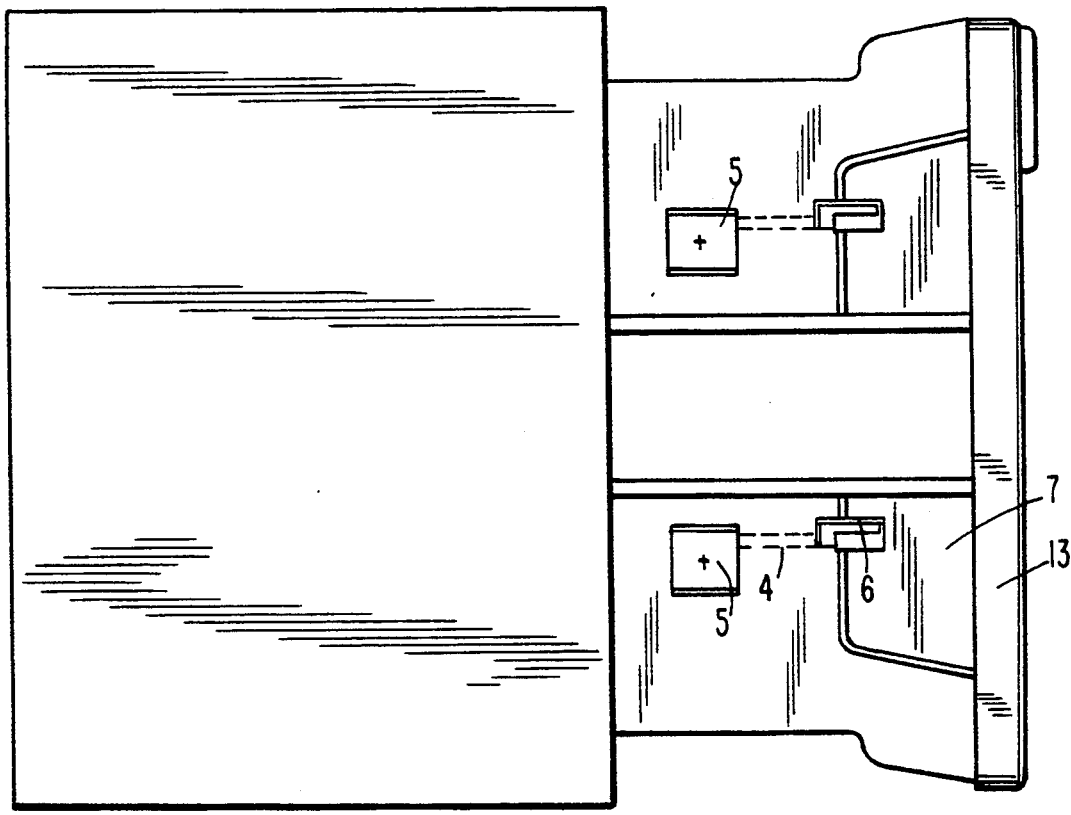
FIG. 2 is a plan view of the invention device shown in FIG. 1.

The device shown in FIG. 1 and FIG. 2 is formed to receive magnetic tape cassettes which are inserted transversely. When a compact cassette is inserted, it engages by an elevation formed in it into the recess 7 located behind the front wall 13.

Figure 3:
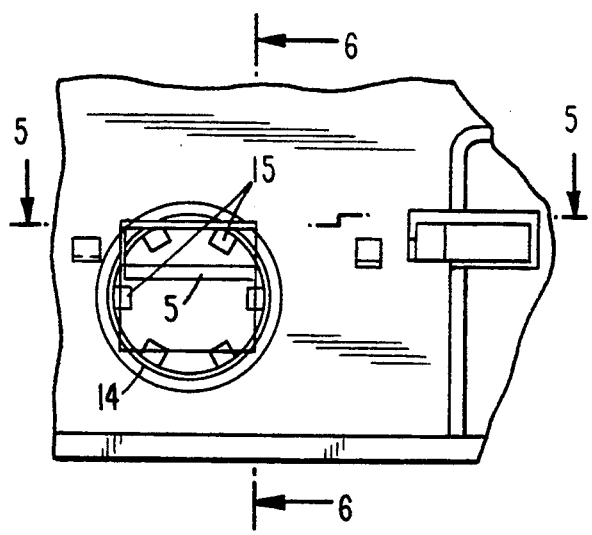
FIG. 3 is a plan view in the region of a locking member with a compact cassette inserted in the inventive device.

The actuation of the locking members when a compact cassette is inserted is shown in FIGS. 3-6. FIG. 3 shows the plan view in the region of a reel hub 14, engaged by the locking member 5 which has been placed into an upright position. Inwardly directed driver members 15 are provided at the reel hub 14. In conjunction with the locking member 6 they secure the reel hub against rotation.

Figure 4:
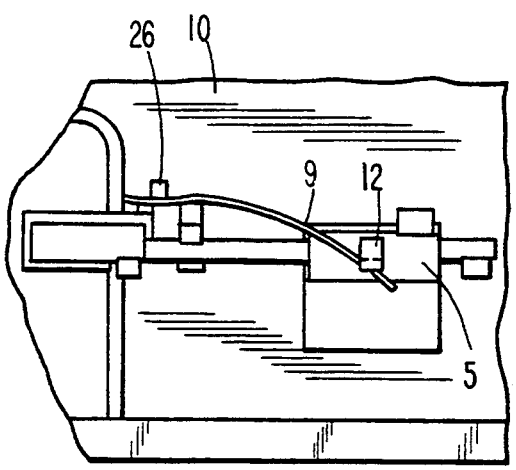
FIG. 4 is a view showing an underside of the slider member in the region of the locking member with the compact cassette inserted.

The underside of the slider member in the region of the locking member 5 is shown in FIG. 4. It clearly illustrates the arrangement of the spring wire 9 which acts on the projection 12. The spring wire 9 at its root end 26 is fixed to the slider base 10.

Figure 5:
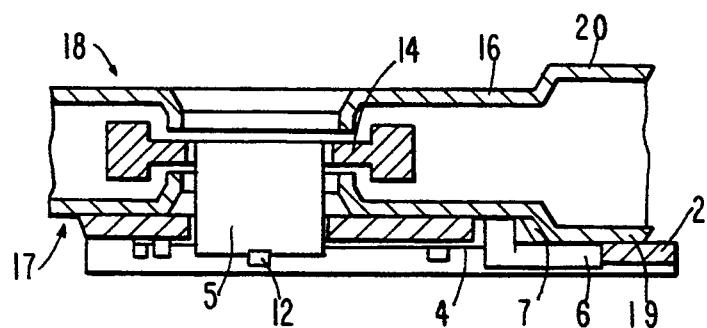
FIG.5 is a section of the inventive device, taken along the line 5—5 in FIG.3.

The actuation of the actuating element 6 by the inserted compact cassette is shown in FIG. 5. The compact cassette 16 on its two opposite flat sides 17 and 18 is provided with respective elevations 19 and 20 which in plan view correspond to the shape of the recess 7. The elevation 19 engages in the recess 7 and thereby presses the actuating element 6 downwardly into the illustrated position. The shaft 4 is consequently rotated and the locking member 5 which projects laterally from it, is pivoted into the shown upper locking position. When the compact cassette 16 is removed again, the spring wire 9 presses the locking member 5 into the position shown in FIGS. 1 and 2 again.

Figure 6:
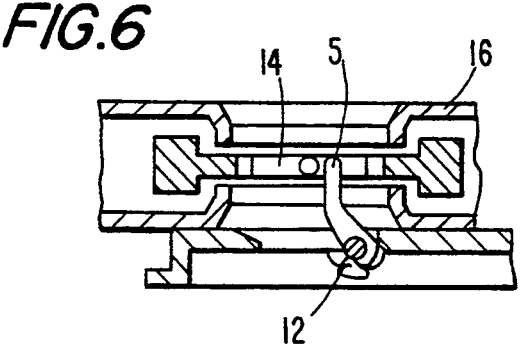
FIG. 6 is a view showing a section of the inventive device, taken along the line 6—6 in FIG.3.

The upwardly directed locking member 5 which engages in a tape reel hub 14 is illustrated in FIG. 6 which shows the section 6—6.

Figure 7:
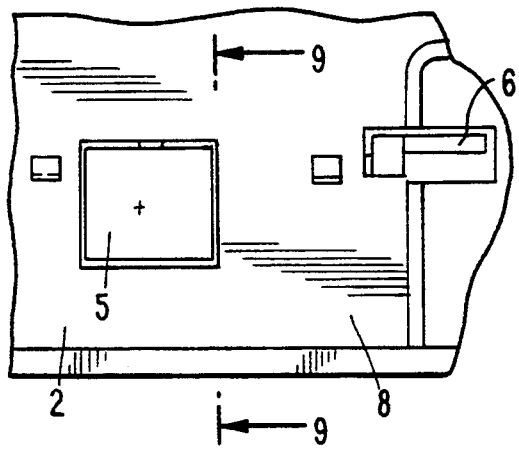
FIG. 7 is a plan view in the region of the locking member with a digital cassette inserted in the device.
Figure 8:
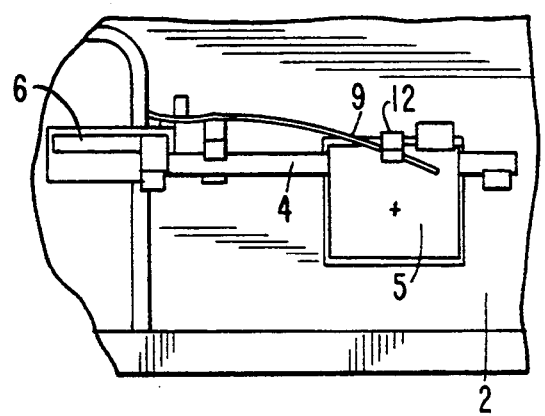
FIG. 8 is a view showing an underside of the slider member in the region of the locking member with the digital cassette inserted.
Figure 9:
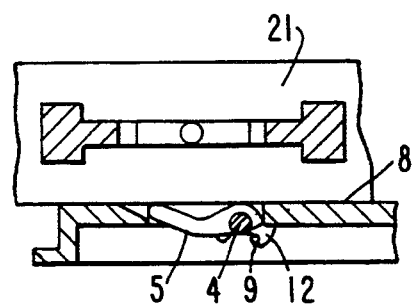
FIG. 9 is a view showing a section of the inventive device taken along the line 9—9 in FIG.7.
Figure 10:
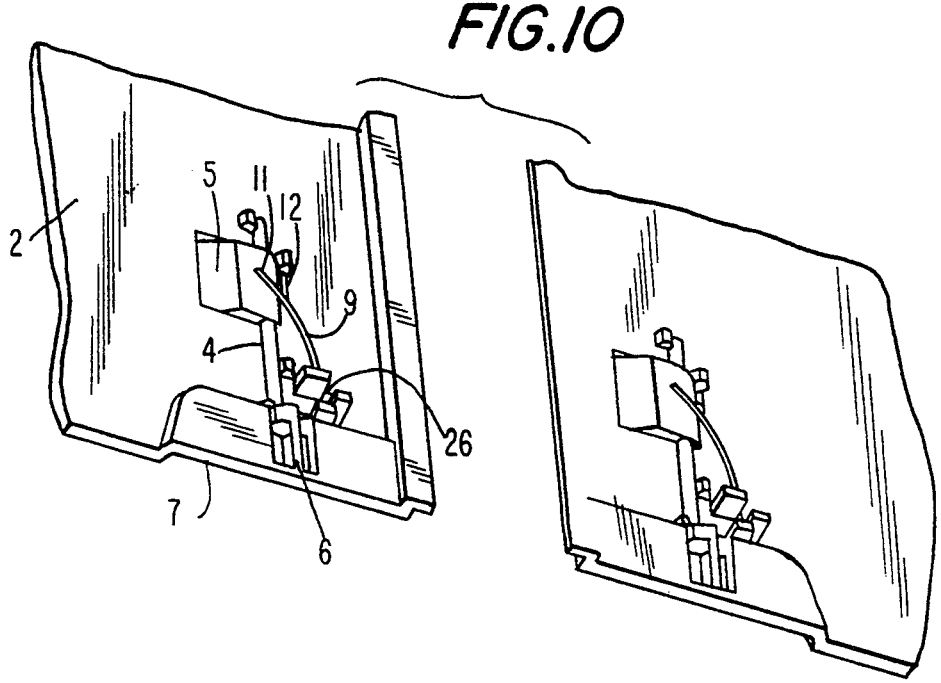
FIGS. 10-13 show perspective views of parts of the inventive device.
Figure 11:
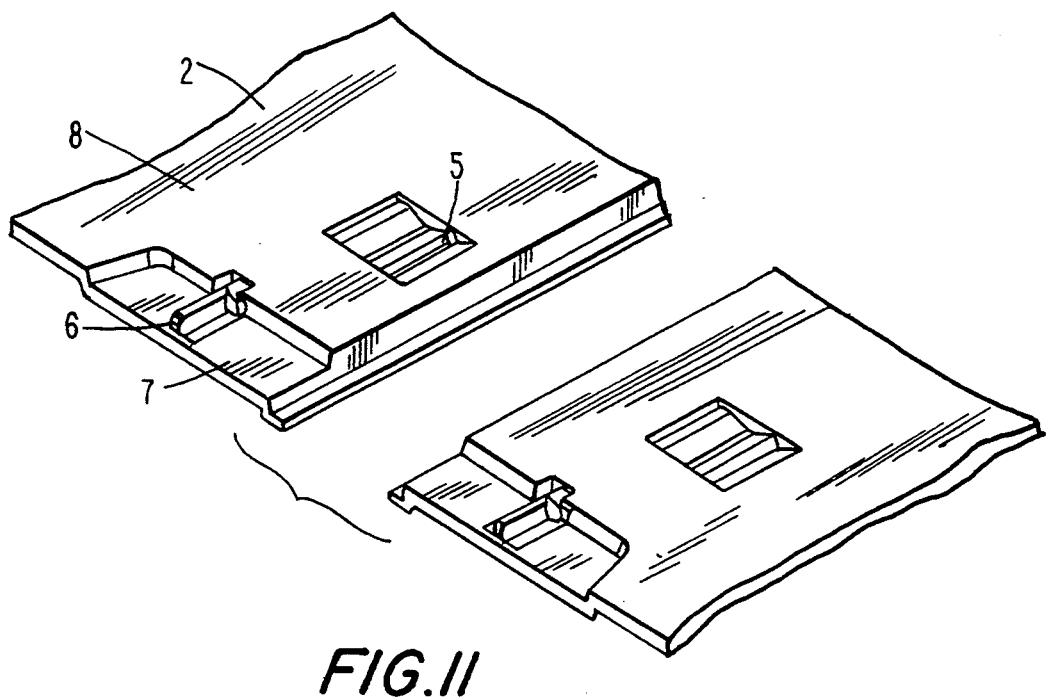
Figure 12:
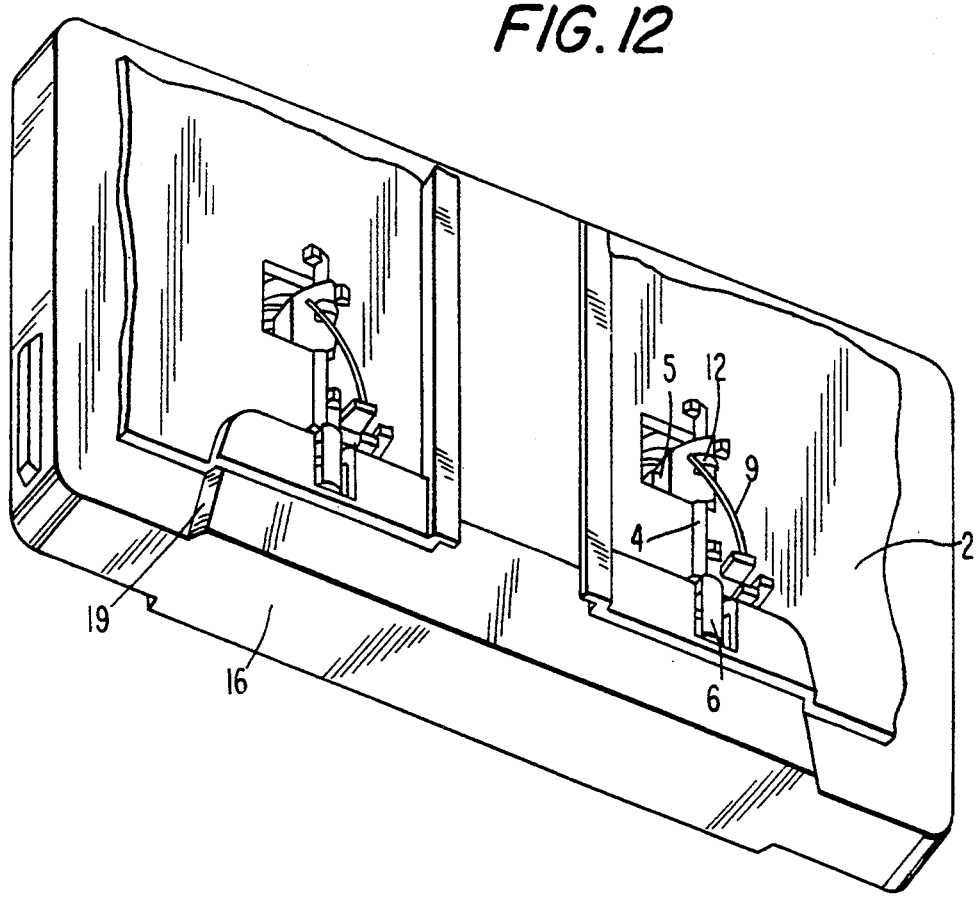
Figure 13:
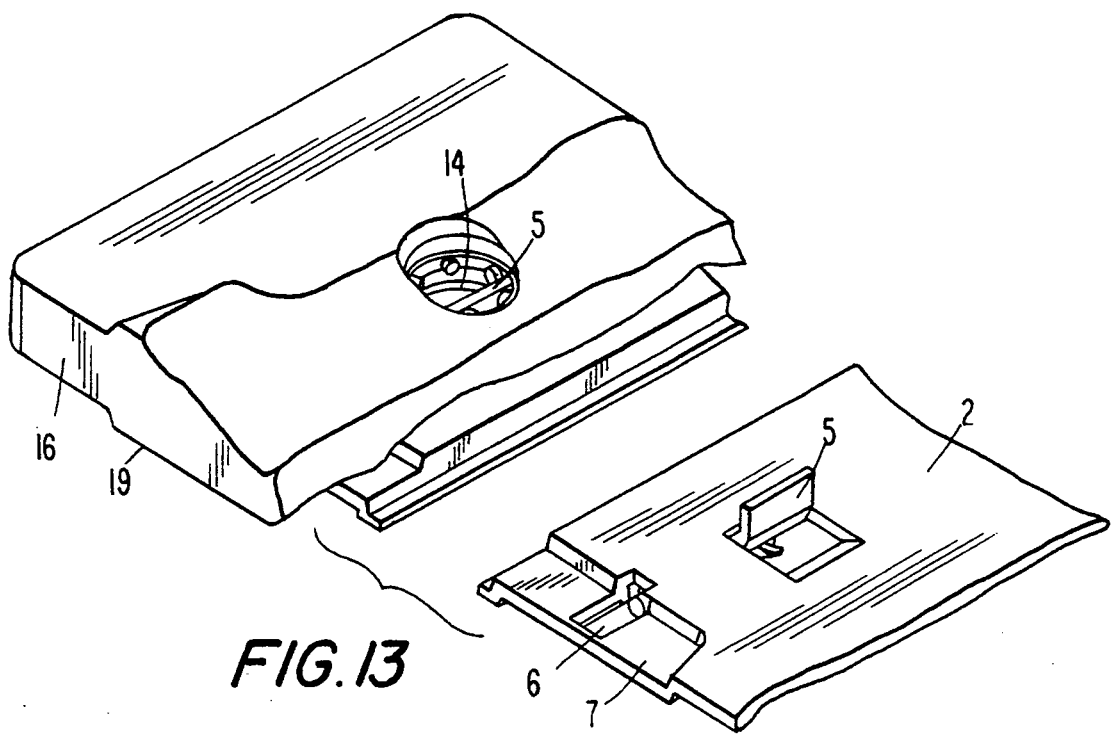

The region of the locking member 5 with a digital cassette inserted in the device is shown in FIGS. 7-9. The plan view of FIG. 7 shows the locking member 5 which lies on the supporting surface 8. The underside of the slider 2 which is also shown in FIG. 8 illustrates the configuration of the spring wire 9 which has been modified compared with FIG. 4.

The locking member 5 which is received into the storage surface is shown in FIG. 9 which is a section 9—9 of FIG. 7. The digital cassette 21 lies on the supporting surface and does not contact with the locking member 5. The locking member 5 is formed as a flat, slightly angled plate and can also be called a locking plate.

The construction and operation of the inventive device can be clarified from consideration of the perspective views of FIGS. 10-13.

It will be understood that each of the elements described above, or two or more together, may also find a useful application in other types of constructions differing from the types described above.

While the invention has been illustrated and described as embodied in a device for storing magnetic tape cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for storing magnetic tape cassettes, comprising locking members engageable with two tape reel hubs of a compact cassette; a supporting surface on which the compact cassette is placed in the device; spring means against which said locking members are pivotable into a locking position for locking the tape reel hubs; a recess with actuating elements located in it and connected with respective locking members to pivot the latter into the locking position, said recess being formed so that an elevation on the inserted compact cassette projects into said recess and presses there against said actuating elements, and when the compact cassette is removed said locking members are lying below said supporting surface and said actuating elements being lifted from a base of said recess at most to a level of said supporting surface; a shaft having a first end from which said locking members associated with the tape reel hubs project laterally and another end from which said actuating elements project laterally and form an eccentric extension of said shaft, said locking member and said actuating element on said shaft being arranged so that they are offset relative to one another by an angle of 120°–180°; a slide member on which said locking members, said actuating elements and said recess are arranged; a housing, said slider member being arranged to be pushed out of said housing into a removal position and having a top side which forms said supporting surface for a compact cassette or a digital cassette to be stored in the device, said shaft having a projection which projects radially from it, said spring means including a prestressed spring wire which has a root end fixed beneath said supporting surface, said spring wire having a free end acting on said projection of said shaft.

2. A device as defined in claim 1; and further comprising a front wall, said slider member being formed so that a magnetic tape cassette is located transversely on said slider member, and said recess being located in a front region behind said front wall.

3. A device as defined in claim 1; and further comprising a front wall, said housing being formed so that a magnetic tape cassette is located transversely in said housing, and said recess is located in a front region behind said front wall.

* * * * *